United States Patent
Wu

(10) Patent No.: US 8,300,933 B2
(45) Date of Patent: Oct. 30, 2012

(54) SYSTEM AND METHOD OF GENERATING COLOR CORRECTION MATRIX FOR AN IMAGE SENSOR

(75) Inventor: Yang Wu, Tainan (TW)

(73) Assignee: Himax Imaging, Inc., Grand Cayman (KY)

( * ) Notice: Subject to any disclaimer, the term of this patent is extended or adjusted under 35 U.S.C. 154(b) by 686 days.

(21) Appl. No.: 12/510,239

(22) Filed: Jul. 27, 2009

(65) Prior Publication Data

US 2011/0019913 A1    Jan. 27, 2011

(51) Int. Cl.
*G06K 9/00* (2006.01)

(52) U.S. Cl. ........................................ 382/167

(58) Field of Classification Search ............ 382/162, 382/166–167, 191, 312, 321; 348/272–273, 348/280, 221.1–225.1, 227.1–229.1, 266; 358/1.9, 2.1, 512–520; 257/440; 438/75; 250/208.1, 226
See application file for complete search history.

(56) References Cited

U.S. PATENT DOCUMENTS

| | | | | |
|---|---|---|---|---|
| 5,668,596 | A * | 9/1997 | Vogel ........................ | 348/222.1 |
| 6,650,438 | B1 * | 11/2003 | Kress et al. ................. | 358/1.9 |
| 6,791,609 | B2 * | 9/2004 | Yamauchi et al. ........... | 348/273 |
| 6,864,915 | B1 * | 3/2005 | Guimaraes et al. .......... | 348/222.1 |
| 7,265,781 | B2 * | 9/2007 | Noguchi ..................... | 348/223.1 |

* cited by examiner

*Primary Examiner* — Jose Couso
(74) *Attorney, Agent, or Firm* — Stout, Uxa, Buyan & Mullins, LLP

(57) ABSTRACT

A system and method of generating a color correction matrix (CCM) for an image sensor are disclosed. Quantum efficiency (QE) spectra of pixels of the image sensor illuminated by a physical light source are measured. Subsequently, color values of the image sensor and color values in a predetermined color space are determined according to the QE spectra and predetermined reference data essential for deriving the color values. Finally, the CCM for the image sensor is generated by applying a fitting algorithm on the color values of the image sensor and the color values in the predetermined color space.

16 Claims, 2 Drawing Sheets

SYSTEM AND METHOD OF GENERATING COLOR CORRECTION MATRIX FOR AN IMAGE SENSOR

BACKGROUND OF THE INVENTION

1. Field of the Invention

The present invention generally relates to image sensors, and more particularly to a system and method for generating a color correction matrix for an image sensor.

2. Description of the Prior Art

In order to achieve high fidelity of colors, an image sensor must behave very similarly to the human eye such as to meet standard color responses defined by the CIE (Commission internationale de l'éclairage or International commission on Illumination) as color matching functions (CMFs). The CMF quantifies the color of each single wavelength in the human visible band (e.g., 380-750 nm) in terms of a set of, for example, R, G, B (red, green, blue) primaries. Each set of primaries defines a color space, which may partially (e.g., sRGB or NTSC) or completely (e.g., XYZ) cover the colors perceptible by the human eye.

A color may be represented by a point in a color space, and may be mapped to different color spaces. In reality, the sensor CMF usually deviates from the human eye response. A fitting algorithm, accordingly, has to be adopted to obtain a color correction matrix (CCM) in order to achieve minimum color perception error.

Another process essential to obtaining proper color perception is the white balance (WB), which equalizes the R, G, B color channels to restore the ideal white response of a non-ideal image sensor.

Conventional approaches to the CCM and the WB are commonly based on system-level measurement, in which a standard color chart, such as the 24-patch Macbeth ColorChecker, is used as a target. The image sensor achieves WB by a white or gray patch, and the sensor's R, G, B outputs of other color patches are compared with the human response. A fitting technique is then used to produce the CCM.

One of the disadvantages of the conventional system-level measurement system is the associated complex calibration and maintenance schemes and efforts required to prevent physical measurement errors.

For the reason that conventional measurement systems and methods cannot effectively provide the CCM and the WB with satisfactory accuracy, a need has arisen to propose a novel scheme for simplifying and improving the CCM and WB processes with high accuracy.

SUMMARY OF THE INVENTION

In view of the foregoing, it is an object of the present invention to provide a system and method of generating a color correction matrix (CCM) for an image sensor based on quantum efficiency spectra of the image sensor. Accordingly, the accuracy of the CCM may be substantially improved with or without reduced physical measurement errors.

According to one embodiment, quantum efficiency (QE) spectra of pixels of an image sensor illuminated by a physical light source are measured. Subsequently, color values of the image sensor and color values in a predetermined color space are determined according to the QE spectra and predetermined reference data essential for deriving the color values. In one embodiment, the predetermined reference data include one or more standard XYZ color matching function (CMF), power spectral density (PSD) of white illumination and reflectance spectra of standard color patches. Finally, the CCM for the image sensor is generated by applying a fitting algorithm on the color values of the image sensor and the color values in the predetermined color space. In one embodiment, the CCM is further converted into another color space.

DETAILED DESCRIPTION OF THE INVENTION

Figure 1:
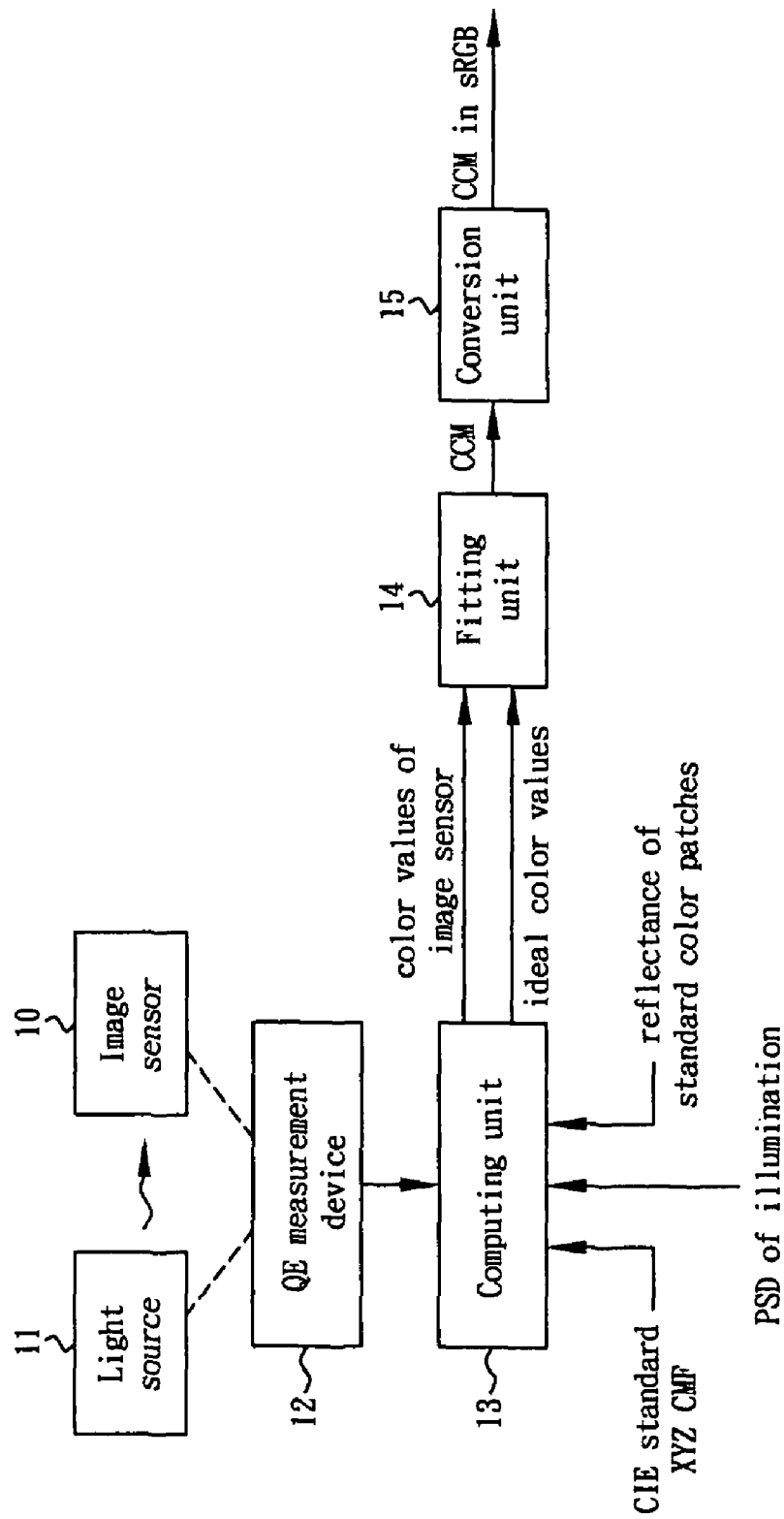
FIG. 1 is a block diagram illustrating a system and method of generating a color correction matrix (CCM) for a physical image sensor according to one embodiment of the present invention.

FIG. 1 is a system block diagram that illustrates a system and method of generating a color correction matrix (CCM) for a physical image sensor, such as a complementary metal-oxide-semiconductor (CMOS) sensor, in order to substantially minimize color perception error according to one embodiment of the present invention.

In the embodiment, an image sensor 10, which is usually non-ideal and likely to incur error in human perception, is illuminated by a light source 11. The light source 11 in the embodiment is a wavelength tunable light source that is capable of scanning the wavelength in the human visible band (e.g., 380-750 nm). A quantum efficiency (QE) measurement device 12 is utilized to generate the QE spectrum of the image sensor 10. The QE measurement device 12 includes, for example, a power meter (or color meter) that measures the number of photons entering a pixel of the image sensor 10 and the number of electrons in a signal collected from the same pixel. The ratio of the latter (i.e., the number of electrons) to the former (i.e., the number of photons) is defined in this embodiment as the QE of the pixel. The above measurement is repeatedly performed at each wavelength, thereby obtaining the QE spectrum, which may be described, for example, by plotting the QEs of R, G, B color pixels vs. wavelength.

Still referring to FIG. 1, a unit 13 for computing color values (or color components) receives the generated QE spectrum (from the QE measurement device 12) and some predetermined reference data essential for deriving the color values of the image sensor 10 and ideal (or standard) color values. The predetermined reference data may commonly be provided by a standard organization, or be collected from a prior or known source. In a preferred embodiment, the predetermined reference data include, but are not limited to, one or more of CIE (Commission internationale de l'éclairage) standard XYZ color matching function (CMF), power spectral density (PSD) of illumination and reflectance of standard color patches. Based on the generated QE spectrum and the predetermined reference data, the computing device 13 then generates color values (e.g., R, G, B) of the image sensor 10 and ideal color values respectively.

The ideal color values and the color values of the (non-ideal) image sensor 10 are subsequently fed to a fitting unit 14, which includes a fitting algorithm for accordingly generating the color correction matrix (CCM) for the image sensor 10, such that the color perception error may be substantially minimized. The implementation of the fitting algorithm for generating the CCM may use a conventional technique, such as that disclosed in U.S. Pat. No. 7,265,781, entitled "Method and apparatus for determining a color correction matrix by minimizing a color difference maximum or average value," the disclosure of which is hereby incorporated by reference.

The generated CCM may, when necessary, be further converted into one or more other color spaces by a conversion unit 15. For example, the CCM may be converted into sRGB color space, which is widely accepted in the consumer electronics industry.

The computing unit 13, the fitting unit 14, and the conversion unit 15 may be implemented, in one exemplary embodiment, by a general computer that is programmed to calculate the required output. In another exemplary embodiment, these units 13, 14 and/or 15 may be implemented by a circuit companioned with or without programming.

One aspect of the computing unit 13 in the present embodiment is that a substantial portion of the computing unit 13 composes no real or physical devices, such as physical color patches as in the conventional system and method. As a result, the embodiment of the present invention not only lowers the overall cost, but also, more importantly, improves the accuracy of the generated CCM without being affected by physical measurement errors incurred, for example, from aging or uncalibrated physical devices. In other words, the accuracy in getting the CCM is primarily dominated by the device-level measurement in the QE measurement device 12 in the embodiment of the present invention. Furthermore, the acquisition of the predetermined reference data in the embodiment is quite simple and economical. To the contrary, a conventional system for generating the CCM employs a system-level measurement, which requires complicated calibration and maintenance, subject to plenty of physical measurement errors.

Figure 2:
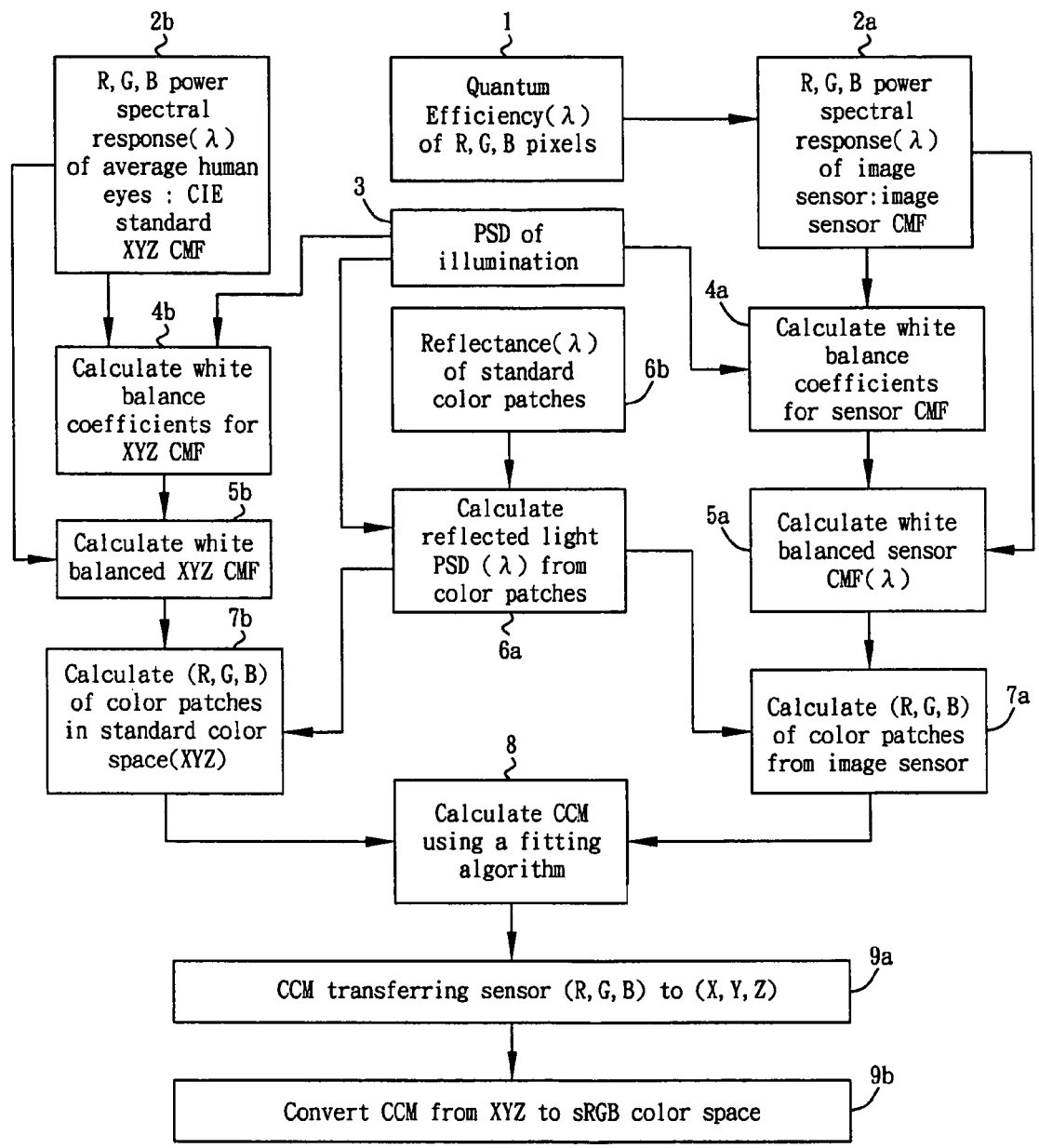
FIG. 2 is a flow diagram illustrating detailed steps, sequence and data flow of the operation of the FIG. 1 embodiment.

FIG. 2 is a flow diagram that illustrates detailed steps, sequence and data flow of operation of the FIG. 1 embodiment. In step 1, quantum efficiency (QE) spectra of R, G, B pixels of the image sensor 10 (FIG. 1) are measured as described above. The QE spectrum $QE(\lambda)$ may, in general, be expressed as follows:

$$QE(\lambda) = \frac{e\#}{P\#(\lambda)}$$

where $\lambda$ denotes the wavelength, e# represents the number of electrons (i.e., electron number), and P# represents the number of photons (i.e., photon number).

As the QE is the response normalized to photon number while the color matching function (CMF) of the image sensor 10 is normalized to optical power, a conversion of the former is thus necessary. Specifically, in step 2a, the QE spectra are converted to power spectral response $PSR(\lambda)$ (or equivalently the image sensor CMF) as follows:

$$PSR(\lambda) = \frac{e\#}{P\#(\lambda) \cdot (h \cdot c / \lambda)} = \frac{QE(\lambda) \cdot \lambda}{h \cdot c} \propto QE(\lambda) \cdot \lambda$$

where h is the Planck constant and c is the light speed in vacuum.

Subsequently, in step 2b, a standard, predetermined or known CMF is acquired. In the embodiment, the CIE standard XYZ CMF, which describes R, G, B power spectral response of average human eyes, is acquired from CIE.

In step 3, the power spectral density (PSD) of light illumination (e.g., white light illumination) is acquired. Exemplary white light illumination is 3200K tungsten or D65 white. The PSD of the light illumination in the embodiment is defined by a predetermined data file. As a result, little (e.g., no) light source degradation and thus little (e.g., no) measurement error are involved as in the conventional system and method. Moreover, there is no limitation of the white light source types in the embodiment. One may acquire standard or custom light sources from any reliable database or pre-performed measurements.

Based on the PSD of the light illumination (from step 3) and the PSR of the R, G, B pixels of the image sensor 10 (from step 2a), white balance coefficients of the image sensor 10 may accordingly be determined in step 4a. Specifically, in the embodiment, the R, G, B values of the image sensor 10 in response to the white illumination may be obtained by calculating the overlap integral of the PSD and the PSR mentioned above. The integration may be calculated over the interval of the wavelength in human visible band (e.g., 380-750 nm):

$$R/G/B = \int PSD(\lambda) \cdot PSR(\lambda) d\lambda$$

After normalizing the values of each color channel with respect to the maximum one, the resultant normalization gains are thus used as the white balance coefficients of the image sensor 10. For example, assume that the G value is the maximum one, the R value is 0.7, and the B value is 0.8. Therefore, the white balance coefficient for the R channel is 1/0.7, and the white balance coefficient for the B channel is 1/0.8.

On the other hand, in step 4b, white balance coefficients for standard XYZ CMF are determined based on the PSD of the light illumination (from step 3) and the standard XYZ CMF (from step 2b) using a method similar to that in step 4a.

Afterwards, in step 5a, the white balance coefficients (obtained in the preceding step 4a) are then applied to (for example, multiplied to) the PSR (or equivalently the CMF) of the image sensor (from step 2a), thereby resulting in the white balanced CMF of the image sensor 10. According to certain embodiments, the white balanced CMF, which can be obtained according to the embodiment or a conventional system, mostly cannot satisfactorily match the human eye response. Therefore, more are needed to be (e.g., as) elaborated in the following steps.

On the other hand, in step 5b, the white balance coefficients (from step 4b) are then applied to the standard XYZ CMF (from step 2b), thereby resulting in the white balanced XYZ CMF.

In step 6a, reflected light PSD from color patches are determined according to the PSD of illumination (from step 3) and the reflectance spectra of standard (or predetermined or known) color patches (from step 6b). Specifically, in the embodiment, the reflected light PSD may be obtained by calculating the overlap integral of the PSD of illumination and the reflectance spectra of standard color patches mentioned above. The integration may be calculated over the interval of the wavelength in the human visible band (e.g., 380-750 nm). The color patches, in the embodiment, are defined by a reflectance spectrum in a predetermined data file. As a result, little (e.g., no) color patch degradation and color meter accuracy are involved as in the conventional system and method. Moreover, there is little (e.g., no) limitation of the number of the color patches in the embodiment. One may acquire more standard or even (non-standard) physically non-practical custom color patches simply by adding the corresponding reflectance spectra.

Subsequently, in step 7a, the color values (e.g., R, G, B) of the (non-ideal) image sensor 10 are determined according to the PSD of the color patches (from step 6a) and the white balanced CMF of the image sensor 10 (from step 5a). Specifically, in the embodiment, the color values of the image sensor 10 may be obtained by calculating the overlap integral of the PSD of the color patches and the white balanced CMF of the image sensor 10 mentioned above. The integration may be calculated over the interval of the wavelength in the human visible band (e.g., 380-750 nm).

On the other hand, in step 7b, the color values (e.g., R, G, B) in standard color space are determined according to the PSD of the color patches (from step 6a) and the white balanced standard XYZ CMF (from step 5b). Specifically, in the embodiment, the color values in standard color space may be obtained by calculating the overlap integral of the PSD of the color patches and the white balanced standard CMF mentioned above. The integration may be calculated over the interval of the wavelength in the human visible band (e.g., 380-750 nm).

Afterwards, the ideal color values (from step 7b) and the color values of the image sensor 10 (from step 7a) are subsequently subjected to a fitting algorithm for accordingly generating the color correction matrix (CCM) for the image sensor 10, such that the color perception error may be substantially minimized. The criterion in the fitting algorithm is to minimize overall color perception differences of all the color patches based on human perception. Furthermore, in some applications, different weighting factors may be customized for some of the color patches. The implementation of the fitting algorithm for generating the CCM may use conventional techniques, and its content is thus omitted for brevity.

The generated CCM from step 8 may, when necessary, be further converted into one or more other color spaces. For example, the CCM may, in step 9a, be converted into CIE XYZ color space, which covers more colors perceptible by the human eye. The CCM may, in step 9b, be further converted into sRGB color space, which is widely accepted in the consumer electronics industry. The conversion from the XYZ to sRGB may be achieved with a standard 3×3 linear color transformation matrix (CTM).

Although specific embodiments have been illustrated and described, it will be appreciated by those skilled in the art that various modifications may be made without departing from the scope of the present invention, which is intended to be limited solely by the appended claims.

What is claimed is:

1. A system for generating a color correction matrix (CCM) for an image sensor, comprising:
    a quantum efficiency (QE) measurement device constructed to generate QE spectra of the image sensor illuminated by a physical light source;
    a unit configured to compute color values and generate color values for the image sensor and ideal color values according to the generated QE spectra and predetermined reference data essential for deriving the color values; and
    a fitting unit arranged to generate the CCM for the image sensor;
    wherein the predetermined reference data include one or more of acquired predetermined color matching function (CMF), acquired power spectral density (PSD) of illumination and acquired reflectance spectra of predetermined color patches; and
    wherein the computing unit is configured to perform the following:
        determining CMF of the image sensor according to the QE spectra;
        acquiring the predetermined CMF;
        acquiring the PSD of illumination;
        determining white balanced CMF according to the PSD of illumination and the CMF of the image sensor;
        determining white balanced predetermined CMF according to the PSD of illumination and, the predetermined CMF;
        determining reflected light PSD from color patches according to the PSD of illumination and the acquired reflectance spectra of predetermined color patches;
        determining the color values of the image sensor according to the reflected light PSD from color patches and the white balanced CMF; and
        determining the color values in a predetermined color space according to the reflected light PSD from color patches and the white balanced predetermined CMF.

2. The system of claim 1, wherein the physical light source is a wavelength tunable light source that scans wavelengths in the human visible band.

3. The system of claim 2, wherein the QE measurement device includes a power meter that measures a number of photons entering a pixel of the image sensor and a number of electrons in a signal collected from the same pixel, wherein a ratio of the number of electrons to the number of photons is determined as QE of the pixel.

4. The system of claim 3, wherein the QE is repeatedly determined at each scanned wavelength, for each color channel, thereby cumulatively obtaining the QE spectra.

5. The system of claim 1, wherein the predetermined CMF is CIE (Commission Internationale de l'eclairage) standard XYZ CMF.

6. The system of claim 1, wherein the fitting unit includes a fitting algorithm that can accordingly generate the CCM such that color perception error is substantially minimized.

7. The system of claim 1, further comprising a conversion unit configured to convert the CCM into another color space.

8. The system of claim 7, wherein the CCM is converted into sRGB color space.

9. A method of generating a color correction matrix (CCM) for an image sensor, comprising:
    a computer for carrying out the steps of
    measuring quantum efficiency (QE) spectra of pixels of the image sensor illuminated by a physical light source;
    determining color values of the image sensor and color values in a predetermined color space according to the QE spectra and predetermined reference data essential for deriving the color values; and
    generating the CCM for the image sensor by applying a fitting algorithm on the color values of the image sensor and the color values in the predetermined color space;
    wherein the predetermined reference data include one or more of acquired predetermined color matching function (CMF), acquired power spectral density (PSD) of illumination and acquired reflectance spectra of redetermined color patches; and
    wherein the step of determining the color values comprises the following:
        determining CMF of the image sensor according to the QE spectra;
        acquiring the predetermined CMF;
        acquiring the PSD of illumination;
        determining white balanced CMF according to the PSD of illumination and the CMF of the image sensor;
        determining white balanced redetermined CMF according to the PSD of illumination and the predetermined CMF;
        determining reflected light PSD from color patches according to the PSD of illumination and the acquired reflectance spectra of predetermined color patches;

determining the color values of the image sensor according to the reflected light PSD from color patches and the white balanced CMF; and determining the color values in a predetermined color space according to the reflected light PSD from color patches and the white balanced predetermined CMF.

10. The method of claim 9, wherein the physical light source is a wavelength tunable light source that scans wavelengths in human visible band.

11. The method of claim 10, wherein a power meter is used to measure a number of photons entering a pixel of the image sensor and a number of electrons in a signal collected from the same pixel, wherein a ratio of the number of electrons to the number of photons is determined as QE of the pixel.

12. The method of claim 11, wherein the QE is repeatedly determined at each scanned wavelength for each color channel, thereby cumulatively obtaining the QE spectra.

13. The method of claim 9, wherein the predetermined CMF is CIE standard XYZ CMF.

14. The method of claim 9, wherein the PSD of illumination is defined on a white light source.

15. The method of claim 9, further comprising converting the generated CCM into another color space.

16. The method of claim 15, wherein the CCM is converted into sRQB color space.

* * * * *